May 14, 1957 L. A. LEECH 2,792,101
BELT CONVEYOR
Original Filed Sept. 8, 1949 10 Sheets-Sheet 1
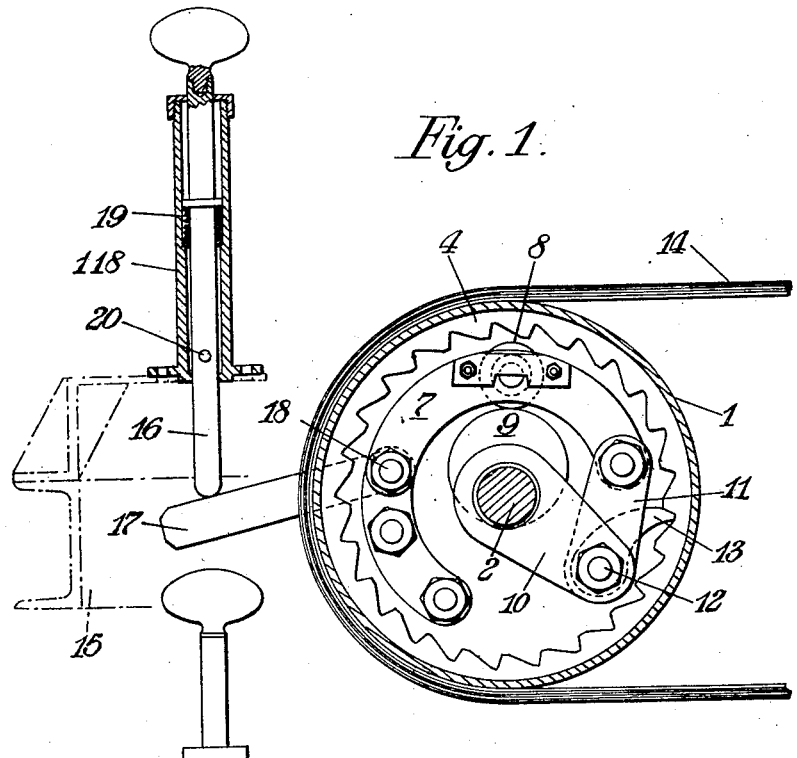
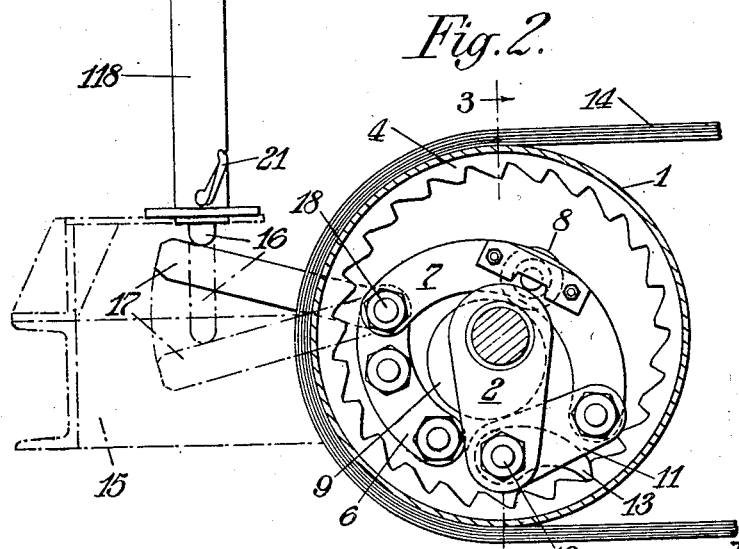

May 14, 1957 L. A. LEECH 2,792,101
BELT CONVEYOR

Original Filed Sept. 8, 1949 10 Sheets-Sheet 2

Inventor:
Laurence A. Leech
by Eugene De Purdy
Attorney

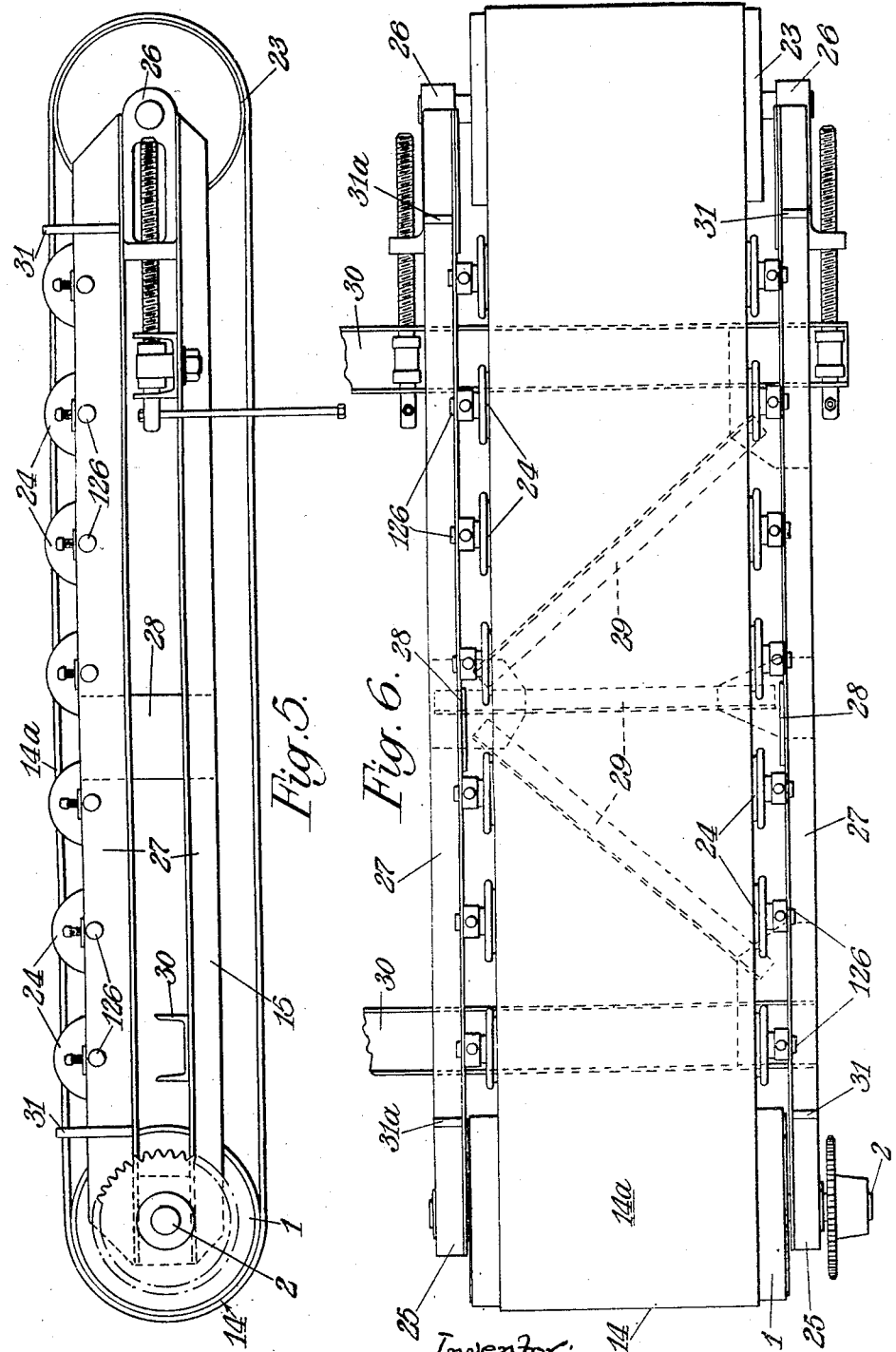

May 14, 1957 L. A. LEECH 2,792,101
BELT CONVEYOR
Original Filed Sept. 8, 1949 10 Sheets-Sheet 4
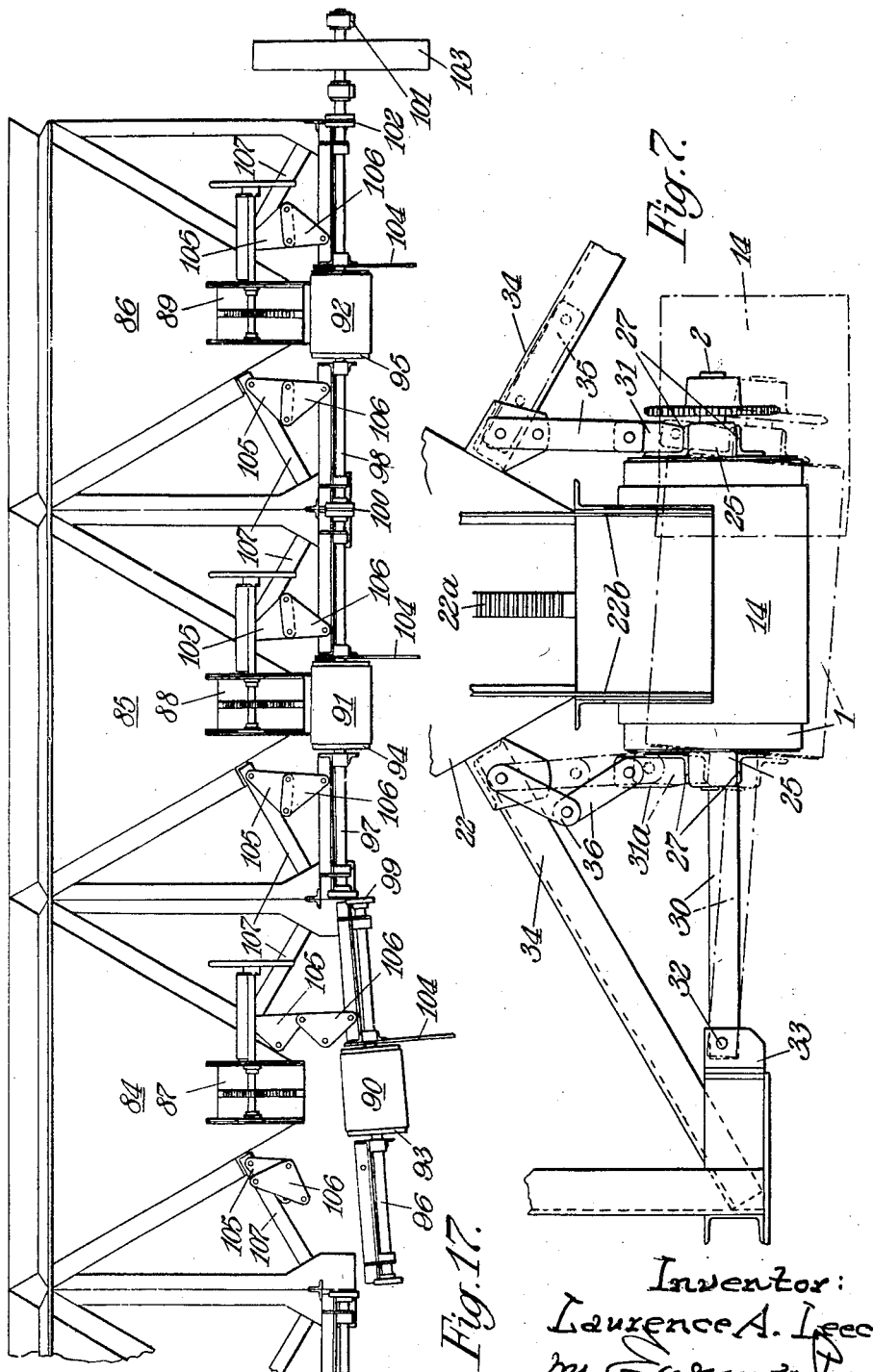

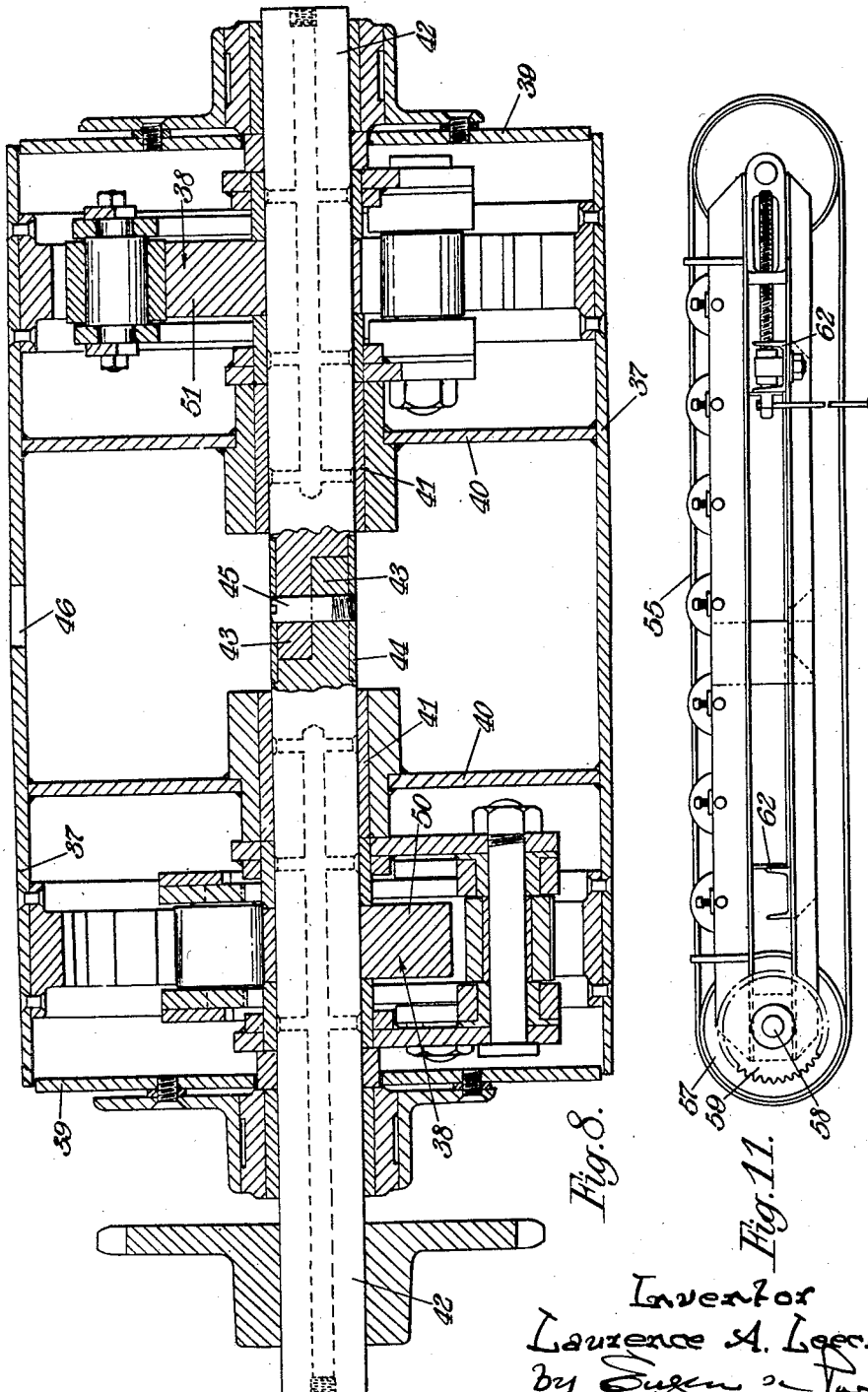

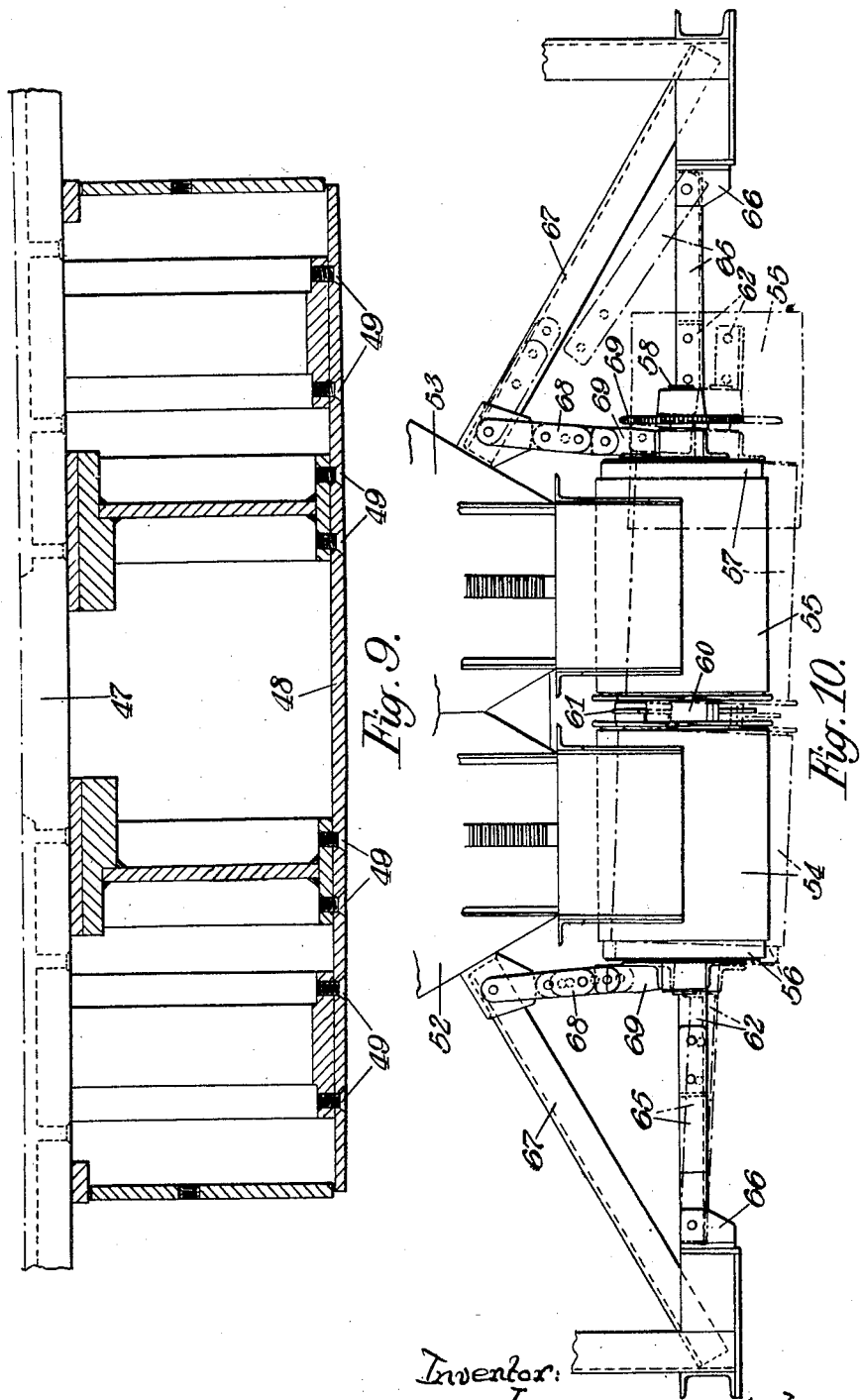

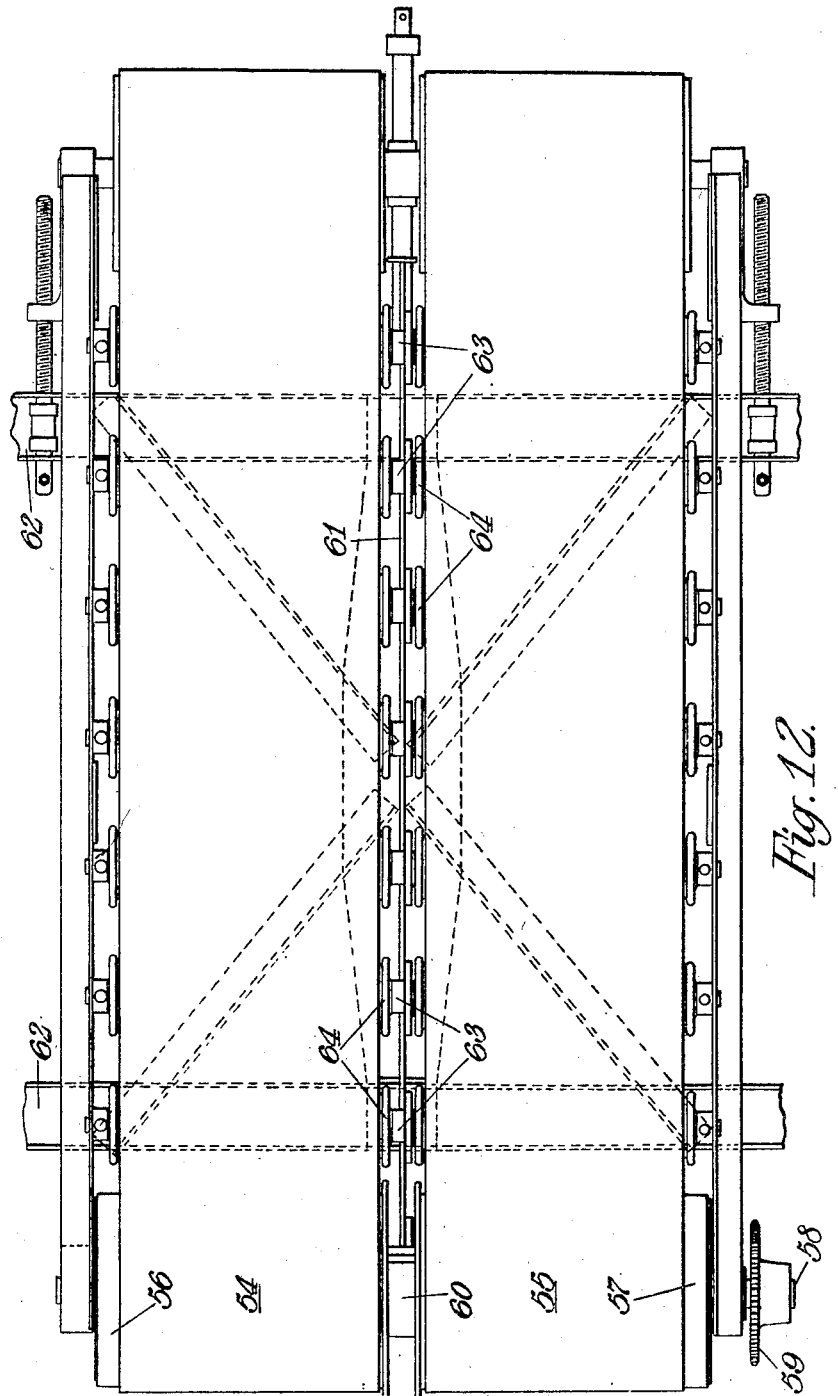

May 14, 1957 L. A. LEECH 2,792,101
BELT CONVEYOR
Original Filed Sept. 8, 1949 10 Sheets-Sheet 8

Inventor:
Laurence A. Leech
by
Attorney

May 14, 1957 L. A. LEECH 2,792,101
BELT CONVEYOR
Original Filed Sept. 8, 1949 10 Sheets-Sheet 9

Inventor:
Laurence A. Leech
by
Attorney

May 14, 1957 L. A. LEECH 2,792,101
BELT CONVEYOR
Original Filed Sept. 8, 1949 10 Sheets-Sheet 10
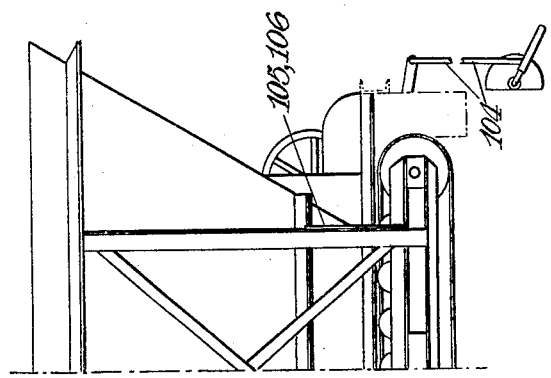
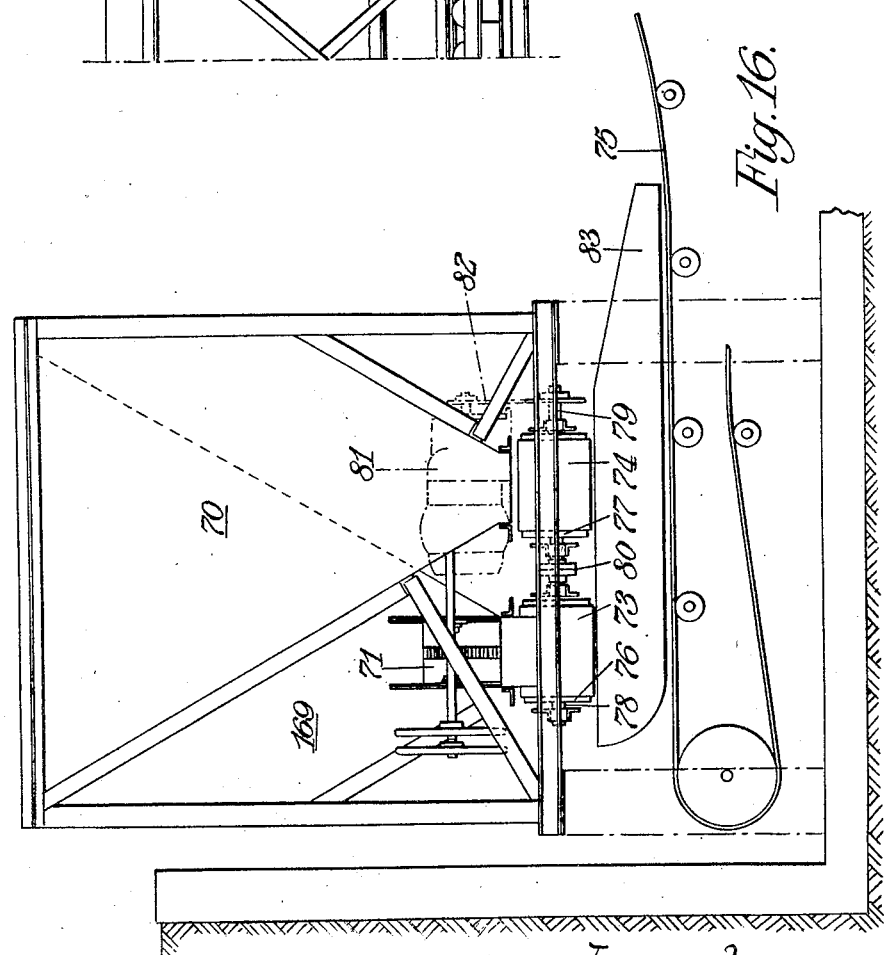
Inventor:
Laurence A. Leech
by [signature]
Attorney

United States Patent Office 2,792,101
Patented May 14, 1957

2,792,101

BELT CONVEYOR

Laurence Arthur Leech, Bishop's Stortford, England, assignor to Millars' Machinery Company Limited, Bishop's Stortford, England Original application September 8, 1949, Serial No. 114,506, now Patent No. 2,686,430, dated August 17, 1954. Divided and this application May 14, 1952, Serial No. 291,026

Claims priority, application Great Britain September 27, 1948

7 Claims. (Cl. 198—57)

This invention relates to belt and like conveyors such as the conveyors of belt feed hoppers in which the hopper delivers material to an endless belt forming the bottom of the hopper which belt is intermittently driven and which is adapted to deliver the material at a regular and uniform rate for example to a feed elevator or conveyor means. This application is a division of my application Serial No. 114,506, filed September 8, 1949, and which has since matured into Patent No. 2,686,430 dated August 17, 1954.

Hitherto it has been the practice to drive the head drum of the belt by pawl and ratchet means located at the side of the belt, the motion of the pawl being taken from a crank actuated by a transverse shaft.

There are numerous disadvantages of such disposition of the drive. Thus in order to increase the capacity, the belt could be driven by opposed cranks but such would necessitate a duplication of the connecting rods and ratchet drive. Moreover, in order that the belt may be readily and quickly changed, the mounting of the feeder unit (belt and associated drums) could be arranged for sidewise hinging instead of an endwise movement, but such is not altogether convenient with the side ratchet drive.

An object of the present invention is to provide an improved feeder belt drive whereby the above disadvantages are avoided.

The invention consists in the provision within the head or driving drum of a conveyor of an oscillatable one-way drive means actuated by a shaft upon which the drum freely turns whereby an intermittent drive is imparted to the drum.

According to the invention the head or driving drum of a belt conveyor is driven intermittently by ratchet mechanism enclosed within the drum and actuated by rotary cam means located within the drum.

The drum may be freely rotatable upon the cam shaft and have an internal ratchet wheel secured to its inner surface with which an oscillating pawl actuated by the cam engages.

Adjustable stop means may be provided for controlling the stroke of the pawl and amplitude of movement of the drum.

In the accompanying drawings:

Figure 1 is an end view of the driving drum of a belt conveyor with the invention applied, the parts being in a no-drive position;

Figure 2 is a similar view with the parts in a position to provide an intermittent movement to the drum;

Figure 5 is a side elevation showing the supporting framework for the belt conveyor and head and tail drums;

Figure 6 is a plan corresponding to Figure 5;

Figure 7 is an end view showing the supporting means by which the drums and belt are displaceable to permit removal of the belt conveyor;

Figure 8 is a sectional elevation showing a double drive for the drum and the mode of dividing the driving shaft;

Figure 9 is a half section showing a modified arrangement of double drive in which a solid shaft is employed;

Figure 10 is an end view of a twin belt conveyor arrangement taking a drive from a common shaft, and showing the supporting means for permitting side removal of the belts;

Figure 11 is a side view of the twin belt arrangement;

Figure 12 is a plan of Figure 11;

Figure 16 is an end view showing the delivery to the receiving conveyor;

Figure 17 is an elevation showing a series of hoppers having belt feeding means according to the invention driving from a common driving means and in which each belt conveyor may be independently dismountable; and Figure 18 is a view of a detail of the control means.

Figure 3:
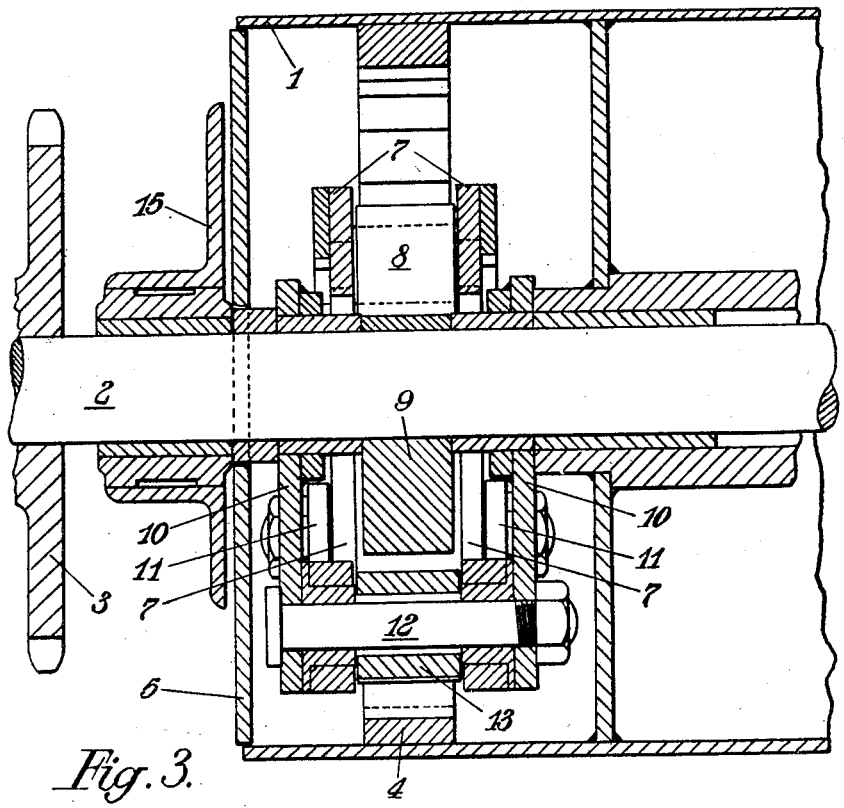
Figure 3 is a section (on an enlarged scale) taken on line 3—3 of Figure 2.
Figure 4:
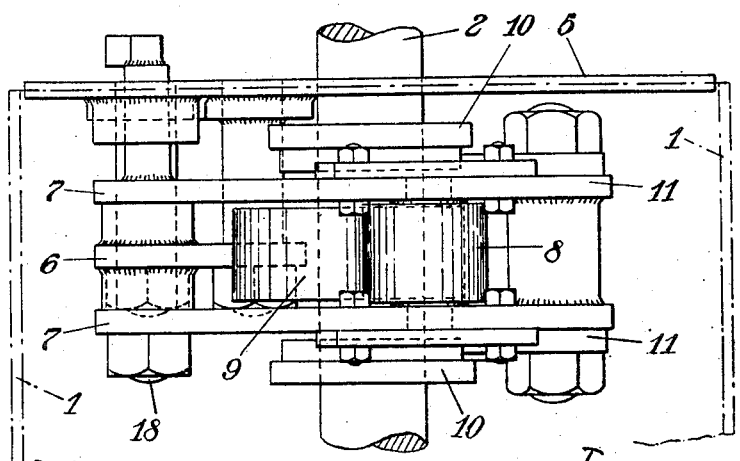
Figure 4 is a plan of Figure 3.

In carrying the invention into effect according to one convenient mode by way of example in the application of the invention to a belt feed hopper, the head or driving drum 1 (see Figures 1 to 4) is mounted to rotate freely upon a horizontal cam shaft 2 to which a drive is imparted by any suitable gearing, for example, chain gear through sprocket wheel 3.

The drum 1 towards one end is provided with an internal ratchet gear 4 having a number of teeth adapted to give even wearing properties with a driving pawl. The ratchet 4 may be formed in any suitable manner as a ring and secured to the drum 1.

The adjacent end of the drum 1 is closed by a stationary disc or end plate 5 which is rigidly secured to a suitable part of the framing 15 of the machine or belt conveyor unit. The end plate 5 forms a support for a carrier unit 6 which is bolted or otherwise secured thereto.

The carrier unit 6 extends parallel to the axis of the drum 1 and has pivotally mounted upon one end thereof, a pair of curved arms 7 which extend over the cam shaft 2. The arms 7 are spaced apart and support between them a cam roller 8 which is adapted to engage the cam 9 on the shaft 2 whereby the arms 7 are oscillated.

Depending freely from the cam shaft 2 is a pair of radial swinging arms 10. The ends of these arms 10 and the free ends of the curved arms 7 are connected by a pair of links 11. The swinging arms 10 also carry a pin 12 upon which a pawl 13 is pivotally mounted, the pawl lying between the links 11. The pawl falls by gravity or is biased by suitable spring means into engagement with the ratchet teeth 4 at the lower zone of the drum 1.

In operation as the cam shaft 2 rotates, the cam 9 raises the curved arms 7 causing the swinging arms 10 to turn about the axis of the shaft 2 and through the pawl 13 impart movement to the drum 1. As the cam roll 8 runs down the cam 9 the curved arms are lowered by gravity and the pawl 13 rides over the ratchet teeth 4. Thus an intermittent feeding movement is imparted to the drum 1 and endless band conveyor 14 driven thereby.

Instead of a single lobe cam, one having two or more lobes may be provided to give a multiple driving effect for one revolution of the cam shaft 2.

The amplitude of the intermittent movement of the drum 1 may be varied by controlling the return movement of the pawl 13. Thus an adjustable stop 16 may be provided on a fixed part of the framing 15 with which a lever 17 attached to a spindle 18 associated with the pivotal end of the curved arms 7 cooperates, the arrangement being such that by an adjustment of the stop 16 the arms 7 and associated pawl 13 is limited in the return movement whereby the forward movement by the action of the cam 9 is varied, to say the pitch space of one, two or three ratchet teeth or other convenient number of teeth.

By an appropriate adjustment of the stop 16 the cam roller 8 may be raised to a position in which it is out of the operative path of the cam 9 (see Figure 1) so that no drive will be imparted to the conveyor band 14.

The stop 16 is mounted to slide in a bearing tube 118 which engages the lever 17. A pin 20 on the stop 16 engages in a helical slot 21 in the tube 118, and is adapted to seat in recesses in the tube and to be held therein by a spring 19.

The arrangement of the drive means within the drum provides a neat and compact apparatus in which only simple guard means for the shaft drive are required. Moreover by the elimination of the laterally disposed crank and pawl and ratchet drive the feeder unit may be hinged sidewise to facilitate belt changing.

The conveyor band 14 (Figures 5, 6 and 7) which forms the bottom of a hopper 22 is mounted upon the head or driving drum and an adjustable drum 23, its upper lap 14a being supported by a series of rollers 24.

The hopper is provided with an adjustable gate valve 22a and side plates 22b which overlie the conveyor band.

The bearings 25 for the shaft 2, the adjustable bearing 26 for the drum 23, and the spindles 126 of the roller 24 are supported by a framing 15 comprising pairs of side angles 27 connected together by plates 28 and angles 29. To the lower angles 27 transverse supporting hinge channels 30 are connected. The upper angles 27 have secured thereto supporting lugs 31, 31a. The hinge channels 30 extend to one side of the conveyor unit and are hinged at 32 to a part 33 of the hopper supporting frame 34.

Each supporting lug 31 is adapted to be removably connected by a link 35 to the frame 34, the arrangement being such that when in the operative position the conveyor unit is supported by the hinge channels 30 and the lugs 31.

The other lugs 31a are connected by double links 36 to the frame 34 which links when the unit is in operative position will carry no weight. When it is desired to remove or replace the conveyor band 14, the connection between the lugs 31 and links 35 are removed so that the weight of the unit will be taken by links 36 the parts then taking the position shown in dot and dash lines in Figure 7 in which the links 36 are aligned.

The ratchet mechanism may be duplicated at the other end of the head drum, and in such case for wide feeder units the two cams may be relatively located to transmit an equal torque to the drum, but for large output the cams could be opposed or set at any suitable angle to each other so as to provide a long continuous movement or two movements per revolution of the cam shaft depending upon the nature of the material to be handled by the feeder unit.

Referring to Figure 8 the drum 37 is provided with two ratchet drive mechanisms each of similar construction to that shown in Figure 3 and indicated generally by the reference 38. The ratchet drive mechanisms are located between the fixed plates 39 and inner plates 40 secured to the drum and on which bearings 41 are provided for the cam shaft 42. In order to facilitate assembly the shaft 42 is divided and formed with halved joint ends 43 which are coupled by a sleeve 44 and coupling pin 45 insertible through a hole 46 in the drum shell. The divided shaft may have a tongue and groove connection.

As an alternative a solid shaft 47, Figure 9, may be used upon which the various parts of the ratchet gear and other parts of the mechanism are assembled after which the drum shell 48 is mounted in position and secured by screws 49. The ratchet gear and other parts associated therewith are similar to those described above.

With the duplicate drive as shown in Figure 8 when used for relative wide feeder units the cams 50, 51 may be relatively located to transmit an equal torque to the drum. For large output the cams could be opposed or set at any other suitable angle to each other so as to provide a long continuous movement of the conveyor or two stepping movements per revolution of the cam shaft depending upon the nature of the material to be handled by the feeder unit.

The ratchet drive of the head drum according to the invention permits the use of two feeder units arranged side by side and driven from a common cam shaft.

Such an arrangement is illustrated in Figures 10 to 13 in which a pair of hoppers 52, 53 or a divided compartment hopper, are arranged side by side to deliver material to belt conveyors 54, 55 which are independently mounted upon and driven by head drums 56, 57.

The drums are driven by ratchet and pawl means from a common cam shaft 58 which is driven by the sprocket wheel 59.

The pawl and ratchet mechanism is of similar construction to those described above and the shaft 58 may be divided and coupled in the manner described with reference to Figure 8. In such case the coupling sleeve would be located in the central bearing 60 which is supported by plates 61 secured to the transverse frame channels 62. The plates 61 which also carry the bearings 63 from the inner ends of the conveyor band supporting roller 64.

The frame channels 62 extend in either side of the conveyor feed unit and are removably secured as by bolts to hinging sections 65 which are hinged to anchoring plates 66 on the frame 67. Multiple link supports 68 are also provided which connect the lugs 69 to the frame 67. The aggregate length of the link supports 68 is variable to permit a shortening when supporting the feeder unit in its working position or for lengthening for supporting the unit at one side when a conveyor band is to be removed in which case, the hinging sections 65 and link supports 68 at the appropriate side are disconnected. It will be appreciated that with the conveyor unit described the cam control may be individually set to provide different rates of feed, or either may be set for no feed.

Thus sand and stone in the required ratio may be fed to an asphalt plant where the mixed aggregate is passed through drying unit together.

The hoppers 52 and 53 may have equal capacity as indicated or may be unequal in capacity and discharge, having feeder conveyors of appropriate different width.

Figure 15:
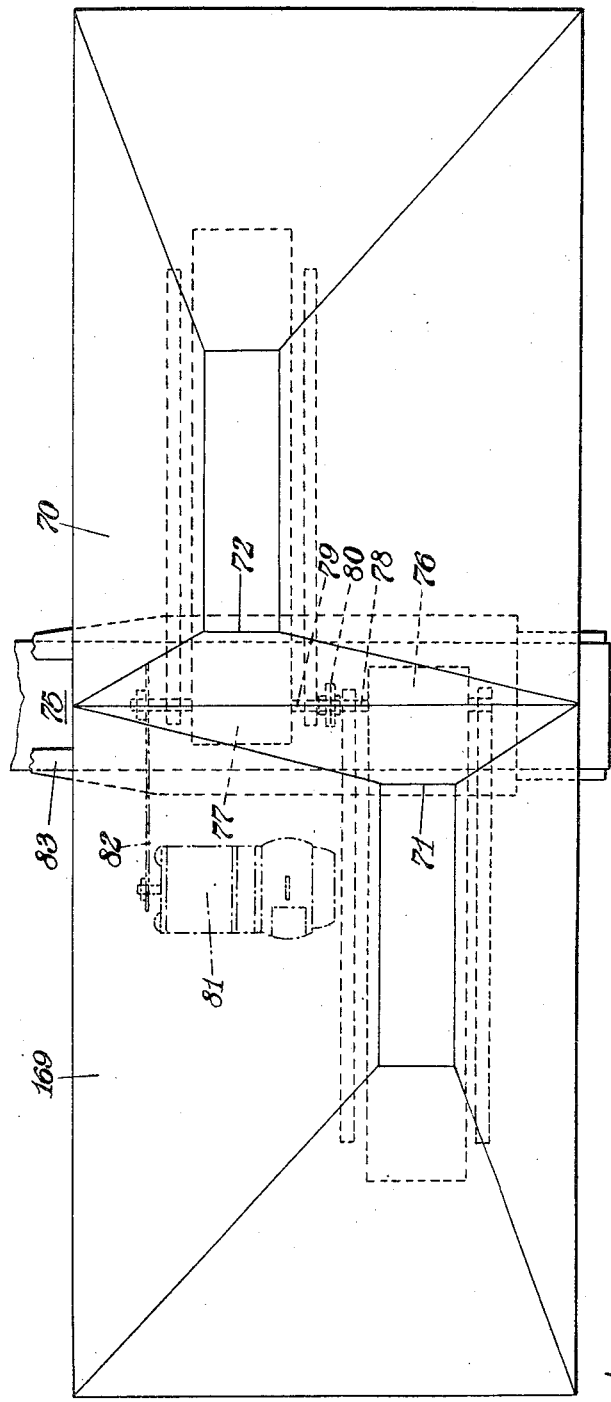
Figure 13:
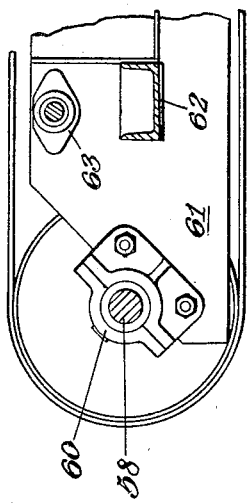
Figure 13 is a detail of an intermediate bearing for the driving shaft.
Figure 14:
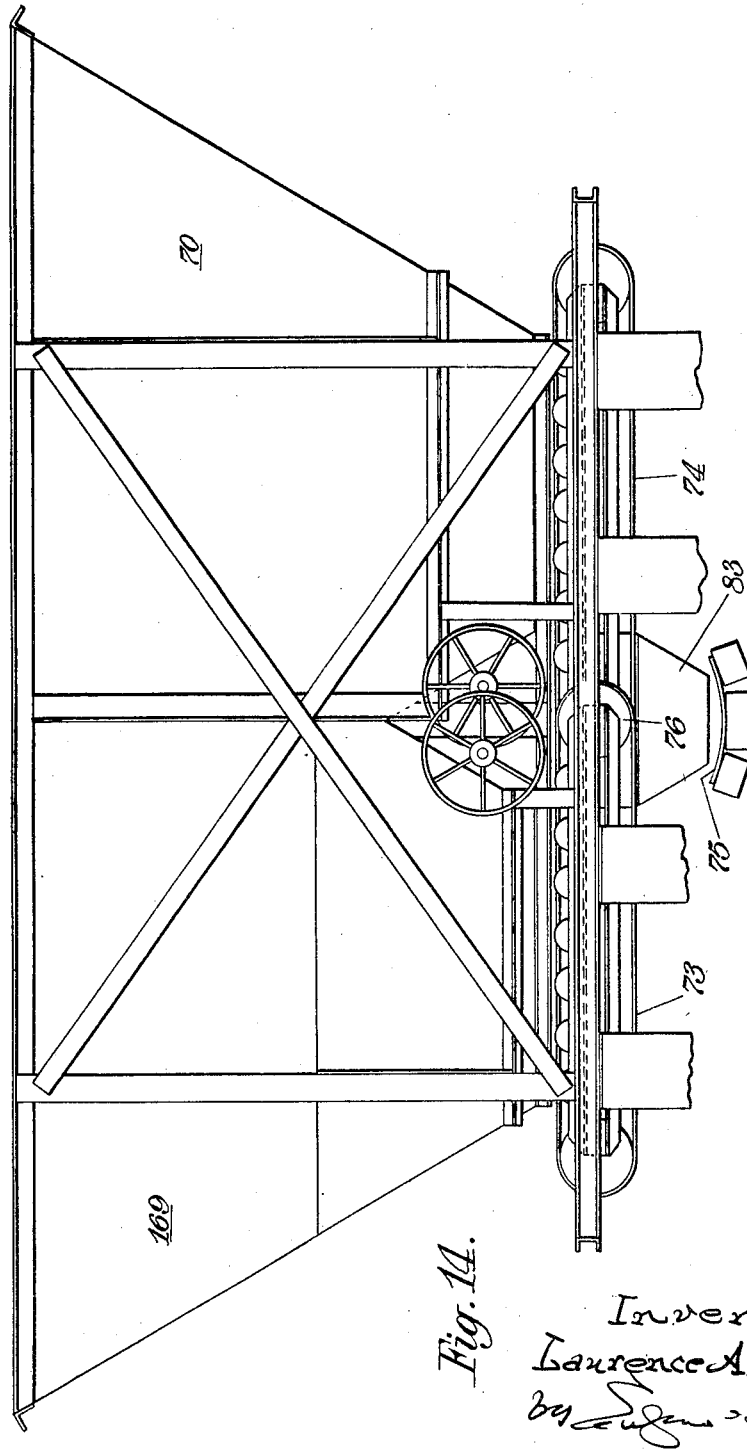
Figure 14 is a side elevation and Figure 15 a plan showing an arrangement for feeding to a common receiving conveyor from a pair of hoppers.

According to a modification of a two hopper plant the hoppers 169, 70 (Figures 14, 15 and 16) may be arranged with their outlets 71, 72 opposed but in staggered relation so that the associated feeder conveyors 73, 74 are located on either side of a common receiving conveyor 75.

The head drums 76, 77 of the conveyor band 73, 74 are driven by pawl and ratchet mechanism as described above from a pair of shafts 78, 79. The shafts are coupled by a flexible coupling 80 and are driven from a suitable motor 81 through the chain and sprocket drive 82.

The conveyor bands 73, 74 deliver to a trough or guide 83 located above the receiving conveyor 75.

By the improved ratchet and pawl drive the shafts 78, 79 may be driven in either direction but the feeding movements of the conveyor bands 73, 74 will always be in the correct direction.

It is common practice in foundries to provide overhead hoppers containing the moulding sand, in which each hopper is provided with a continuously running feeder belt.

The present invention comprising the pawl and ratchet drive for the feeder conveyor may be applied in such a plant. Thus referring to Figures 17 and 18 the overhead hoppers 84, 85 and 86 each having an adjustable discharge 87, 88 and 89 are provided with feeder conveyor bands 90, 91 and 92 driven by head drums 93, 94, 95, through internal pawl and ratchet mechanism similar to that above described.

Each drum is provided with a cam shaft 96, 97 and 98 which are coupled by flexible couplings 99, 100 and to a driving shaft 101 by a coupling 102. The shaft 101 is driven by a pulley 103.

Each feeder assembly is provided with a control device 104 similar to that described above so that each conveyor band 90, 91 and 92 may be intermittently driven at the appropriate rate or rendered inoperative so that no feed takes place and the conveyor is stationary.

The feeder assemblies are supported by extensible links comprising a pair of plates 105, 106 which are anchored to the framing 107.

When it is desired to hinge a unit for removing the conveyor band the couplings at each end of the associated shaft are unfastened and both sets of links 105, 106 lengthened so that the shaft moves downwardly to a position parallel to its normal position. The links 105, 106 at the side remote from the control 104 is then disconnected so that the unit will assume an inclined position as shown with respect to the belt 90 enabling the conveyor to be removed.

Instead of the drive being effected at one end, such may be located at an intermediate position.

It will be appreciated that the shafting 96, 97 and 98 will revolve continuously but each belt 90, 91, 92 will be stationary until it is required to feed the moulding sand from the appropriate hopper.

Obviously the hoppers 84, 85, 86 may be differently spaced and may be of varying capacity and further they may be provided with different widths of feeder conveyor.

I claim:

1. A belt feed hopper having walls extending to a bottom opening, an intermittently movable belt feed conveyor band extending across said opening, a feed opening in one of said walls, an adjustable feed door controlling said feed opening, said conveyor band being operable to support the contents of the hopper and feed them through said feed opening, a driving drum for said conveyor band, a driving shaft on which said drum is freely mounted, an internal ratchet gear on the interior of the drum, a pivotally-mounted pawl engaging said gear, cam means on said shaft for oscillating said pawl to impart intermittent feeding movement to the drum and conveyor band, a tail drum for said conveyor band, rollers supporting the upper load-carrying lap of said conveyor band intermediate said driving and tail drums, a unitary mounting carrying said drive and tail drums and rollers, a framework supporting the hopper, and detachable supporting means at each side of the unitary mounting for supporting the mounting from the framework, said detachable supporting means comprising removable pivot means, whereby removal of the pivot means upon one side of the unit permits the unit to be tilted laterally upon the pivot means at the other side of the unit to a position clear of the framework so that the conveyor band may be removed in a sidewise direction.

2. A belt feed hopper as claimed in claim 1, wherein said detachable supporting means comprise transverse members extending from the side of the unitary mounting and pivotally connected at an outer end to said framework, extensible link suspension means between said side of the unitary mounting and said framework, and detachable link means connected to the other side of said unitary mounting and the framework and supporting the unitary mounting in its operative position.

3. A belt feed hopper plant comprising a pair of hoppers each having a conveyor band and driving means therefor as claimed in claim 1, wherein a common driving shaft is provided on which the drums are freely mounted, said shaft having a pair of cams, one for each drum driving means.

4. A belt feed hopper plant comprising a hopper having a pair of compartments, each compartment having a bottom opening and a conveyor band and driving means therefor, as claimed in claim 1, and wherein a common driving shaft is provided on which the drums are freely mounted, said shaft having a pair of cams, one for each drum driving means.

5. A belt feed hopper plant comprising a pair of hoppers arranged side by side, each hopper having a feed conveyor band and driving means therefor as claimed in claim 1, the driving means being driven from a conveyor shaft, said conveyor bands and driving means being carried by a unitary mounting which is supported from a hopper framework by side detachable means, whereby the detachable means from either side may be removed to permit a lateral tilting of the unitary mounting toward that side permitting a sidewise removal of the adjacent conveyor.

6. A belt feed hopper plant comprising a series of hoppers arranged side by side each hopper having a feed conveyor band and driving means therefor as claimed in claim 1, wherein the driving shafts of each conveyor band are aligned and coupled together and to a common driving element, the hoppers being supported upon a framework, each side shaft and associated parts being supported from the framework by displaceable supporting means permitting displacement of the shaft and sidewise removal of the conveyor band, each driving drum being provided with a no-drive adjustment means.

7. A belt feed hopper plant comprising a pair of hoppers arranged on either side of a central line and in staggered relation, each hopper having a feed conveyor band and driving means therefor, as claimed in claim 1, the driving drums of the feed conveyors being driven from a common shaft coincident with said central line, and a common receiving belt conveyor arranged between the hoppers along said central line to receive material from both feed conveyors.

References Cited in the file of this patent
UNITED STATES PATENTS

| | | |
|---|---|---|
| 1,215,739 | Stehli | Feb. 13, 1917 |
| 1,864,758 | Podmore | June 28, 1932 |
| 1,946,452 | Bridges | Feb. 6, 1934 |

FOREIGN PATENTS

| | | |
|---|---|---|
| 358,459 | Germany | Sept. 9, 1922 |